US011440655B1

(12) United States Patent
Adams

(10) Patent No.: US 11,440,655 B1
(45) Date of Patent: Sep. 13, 2022

(54) THRUST VECTORING CONTROL OF A CYCLOROTOR

(71) Applicant: Government of the United States as represented by the Secretary of the Air Force, Wright-Patterson AFB, OH (US)

(72) Inventor: Zachary H. Adams, West Lafatette, IN (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 0 days.

(21) Appl. No.: 17/220,042

(22) Filed: Apr. 1, 2021

Related U.S. Application Data

(62) Division of application No. 15/830,581, filed on Dec. 4, 2017, now Pat. No. 10,994,840.

(51) Int. Cl.
| | | |
|---|---|---|
| *B64C 39/00* | (2006.01) | |
| *B64B 1/34* | (2006.01) | |
| *B64B 1/20* | (2006.01) | |
| *B63H 1/10* | (2006.01) | |
| *B63G 8/08* | (2006.01) | |
| *F03D 7/06* | (2006.01) | |

(52) U.S. Cl.
CPC .............. *B64C 39/003* (2013.01); *B63G 8/08* (2013.01); *B63H 1/10* (2013.01); *B64B 1/20* (2013.01); *B64B 1/34* (2013.01); *F03D 7/06* (2013.01); *F05B 2240/211* (2013.01); *F05B 2240/60* (2013.01); *F05B 2240/91* (2013.01); *F05B 2260/506* (2013.01)

(58) Field of Classification Search
CPC .......... F01D 5/147; F01D 5/187; F01D 5/282; F05D 2240/304; F05D 2240/306; B64C 27/72; B64C 27/80; B64C 39/005; B64C 27/605; F03D 3/067; F03D 3/068; F03D 7/06; F03D 7/0224
See application file for complete search history.

(56) References Cited

U.S. PATENT DOCUMENTS 3,716,014 A * 2/1973 Laucks .................... B63H 1/10
440/93
8,461,708 B2 * 6/2013 Stephens ................ F03D 3/068
290/55
(Continued)

*Primary Examiner* — David E Sosnowski
*Assistant Examiner* — Andrew Thanh Bui
(74) *Attorney, Agent, or Firm* — AFMCLO/JAZ; Matthew D. Fair

(57) ABSTRACT

A device for controlling thrust vectoring of a cyclorotor includes a control cam positionable relative to a drive shaft of a cyclorotor along each of a first axis and a second axis, where the drive shaft is rotatable about a third axis. The device may further include a frame having a plurality of sides, where the frame is disposed at least partly around the drive shaft of the cyclorotor, a first positioning assembly disposed on a first side of the frame, where the first positioning assembly is structurally configured to move the frame along the first axis, and a second positioning assembly disposed on a second side of the frame, where the second positioning assembly is engaged with the control cam and structurally configured to move the control cam relative to the frame along the second axis.

8 Claims, 8 Drawing Sheets

(56) References Cited

U.S. PATENT DOCUMENTS

| | | | |
|---|---|---|---|
| 9,346,535 B1 * | 5/2016 | Adams | B64C 39/005 |
| 9,644,604 B2 * | 5/2017 | Whinney | F03D 7/06 |
| 10,814,967 B2 * | 10/2020 | Groninga | B64C 25/52 |

* cited by examiner

THRUST VECTORING CONTROL OF A CYCLOROTOR

CROSS-REFERENCE TO RELATED APPLICATIONS

This application is Divisional application of U.S. application Ser. No. 15/830,581 filed on Dec. 4, 2017 which claims the benefit of U.S. Provisional Application No. 62/546,412 filed Aug. 16, 2017, the entire content of which is hereby incorporated by reference.

STATEMENT OF GOVERNMENT INTEREST

The invention described herein may be manufactured, used, and licensed by or for the Government of the United States for all governmental purposes without the payment of any royalty.

BACKGROUND

Cyclorotors, which may also be referred to herein or in the technical art as cycloidal rotors, cycloidal propellers, and similar, are fluid propulsion devices that convert shaft power into the acceleration of a fluid using a rotating axis perpendicular to the direction of fluid motion. Similarly, cycloturbines use the aforementioned concepts to generate power, e.g., in wind energy harvesting and the like. A cyclorotor may include several blades with a span-wise axis parallel to the axis of rotation and perpendicular to the direction of fluid motion. These blades may be cyclically pitched (e.g., having a waveform with a period equal to the rotor revolution) to produce force (e.g., thrust or lift) in any direction normal to the axis of rotation. Cyclorotors may be used for propulsion, lift, and control on air and water vehicles, where an aircraft using cyclorotors as the primary source of lift, propulsion, and control is referred to as a "cyclogyro."

Thus, cyclorotors extract freestream fluid energy and produce thrust. Cyclorotors can be implemented for propulsion, lift, and control of lighter than air (LTA) aircraft, or they can be mounted vertically below a ship to provide propulsion and control, and can eliminate the need for a rudder. Cyclorotors also provide the primary source of lift, propulsion, and control for cyclogyros.

Cyclorotors hold a number of distinct advantages over their traditional propeller/rotor counterparts and have great potential for a number of niche applications. For example, cyclorotors possess a capability for rapid thrust-vectoring. As such, cyclorotors can be used to create highly maneuverable vessels because they only have to alter the pitching motion of their blades to redirect thrust to any direction perpendicular to the axis of rotation. Thus, cyclorotors lack a significant inertia body to rotate and their thrust vectoring may be extremely rapid. Moreover, the vehicle or rotor in cyclorotors need not be reoriented to transition between hovering and forward flight up to the maximum forward velocity, which reduces their complexity in comparison to other vertical takeoff and landing (VTOL) concepts.

However, the potential of cyclorotors is not yet realized in widespread applications. A central barrier to the proliferation of cyclorotors is a lack of understanding of the aerodynamic interaction between the turbine and the freestream flow. In particular, in a cyclorotor, blade pitch should be precisely actuated throughout a revolution to achieve a desired blade angle of attack and maximize performance.

Thus, there remains a need for improved techniques for implementing optimal blade pitching kinematics for cyclorotors or cycloturbines.

By way of background, a detailed description of the operating principals of cycloidal rotors, including a discussion of prior art attempted solutions, can be found in "Investigation and Characterization of a Cycloidal Rotor for Application to a Micro-Air Vehicle," Eric Parsons, M.S. Thesis, University of Maryland (2005), which is incorporated by reference in its entirety. Also, some other useful background information on cyclorotors and cyclogyros can be found in U.S. Pat. Nos. 2,123,916 and 2,580,428, which are incorporated by reference in their entirety. Further, the inventor's own U.S. Pat. No. 9,346,535, which is incorporated by reference in its entirety, provides a general background of controlling pitch of cycloidal rotor blades.

SUMMARY

In an implementation, a device for controlling thrust vectoring of a cyclorotor includes a control cam positionable relative to a drive shaft of a cyclorotor along each of a first axis and a second axis, where the drive shaft is rotatable about a third axis, and where the first axis and the second axis are substantially perpendicular to the third axis. The device may further include a frame having a plurality of sides, where the frame is disposed at least partly around the drive shaft of the cyclorotor, a first positioning assembly disposed on a first side of the frame, where the first positioning assembly is structurally configured to move the frame along the first axis, and a second positioning assembly disposed on a second side of the frame, where the second positioning assembly is engaged with the control cam and structurally configured to move the control cam relative to the frame along the second axis.

In an implementation, a method for controlling thrust vectoring of a cyclorotor includes positioning a frame along a first axis, the frame having a plurality of sides disposed at least partly around a drive shaft of a cyclorotor, where the frame is engaged with a control cam such that movement of the frame along the first axis simultaneously moves the control cam along the first axis, and positioning the control cam relative to the frame along a second axis, where positioning of the control cam alters a pitch of one or more of a plurality of blades of the cyclorotor.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 2:
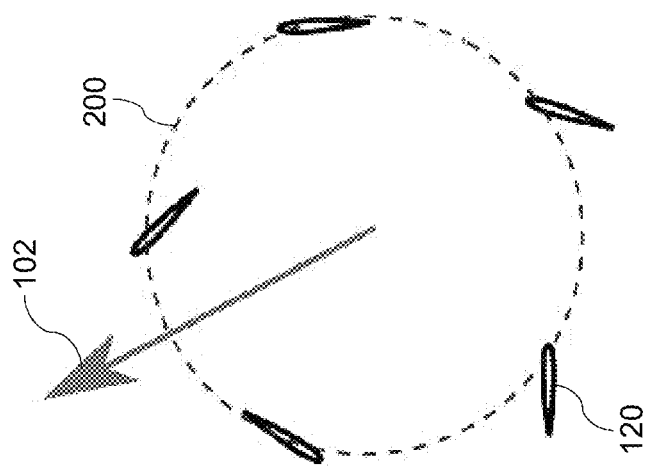
FIG. 2 illustrates hovering blade pitch motion of a cyclorotor.

The various methods, systems, apparatuses, and devices described herein may generally provide for controlling thrust vectoring of a cyclorotor, e.g., by moving a cam to account for changing freestream flow direction or morphing blade pitch kinematics to account for varying forward speed.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may include controlling thrust vectoring of a cyclorotor. As discussed above, cyclorotors can be characterized by the rotation of blades (which may also be referred to herein or in the art as "rotors") about an axis where the span of the blades is generally parallel to the axis of revolution and perpendicular to the direction of flight. In cyclorotors, aerodynamic forces are generated by cyclically pitching the blades forward and back as they move around the rotational axis. The manner in which the blades pitch during a rotation may be referred to as a "pitching schedule." For example, in a hovering flight condition, a positive pitch on the top portion of the cycle and a negative pitch on the bottom portion can produce an upward force. By altering the pitching schedule, a cyclorotor can produce thrust in any direction perpendicular to its rotational axis. Thus, it may be desirable to have devices, systems, and methods for producing and changing blade pitching kinematics on cyclorotors.

A brief discussion on some terminology used herein may be helpful for the understanding of this disclosure. The term "dynamic" in this disclosure may be used to indicate varying cyclic control, e.g., controlled variation according to need, as opposed to a fixed cycle. For purposes of a cyclorotor, while the pitch of each cyclorotor blade is varied during a particular flight profile, that variation pattern may be fixed, and dynamic control means that the variation pattern of blade pitch can be changed as needed for different flight profiles. The term "pitch" in this disclosure may be used to refer to the angle that the chord of each individual cyclorotor blade makes with a line tangent to the blade's path around a cyclorotor's axis of rotation.

Figure 1:
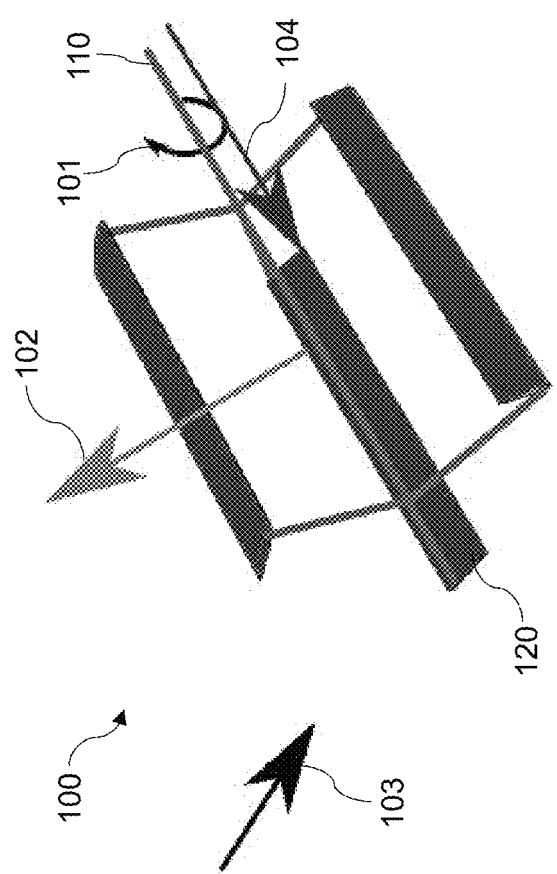
FIG. 1 illustrates an example of a cyclorotor.

FIG. 1 illustrates an example of a cyclorotor, e.g., a cyclorotor 100 of the prior art. The cyclorotor 100 shown in the figure includes a rotatable drive shaft 110 (where rotation is indicated by the first arrow 101 in the figure), which is coupled with a plurality of blades 120. As shown by the second arrow 102 in the figure, which represents thrust or lift, the cyclorotor 100 may produce thrust by periodically varying blade pitch once per revolution. The third arrow 103 in the figure represents relative wind, and the fourth arrow 104 in the figure represents power consumed.

FIG. 2 illustrates hovering blade pitch motion of a cyclorotor. FIG. 2 may include a cross-sectional representation of blade pitch motion of the cyclorotor 100 shown in FIG. 1, and thus includes the plurality of blades 120 and the second arrow 102. The cycle of the blades 120 of the cyclorotor 100—the path of travel of the blades 120 relative to an axis running through the drive shaft 110—is indicated by the dotted line 200. By way of example of varying blade pitch, and as shown in FIG. 2, hover positive blade pitch on the upper portion of the cycle and negative blade pitch on the bottom portion of the cycle may produce a net upward thrust as shown by the second arrow 102. Thus, it can be seen that altering the nature of the pitch motion may provide for rapid thrust vectoring. And, as shown in FIG. 3 below, changing the phasing of the pitching in hover can quickly vary the thrust direction.

Figure 3:
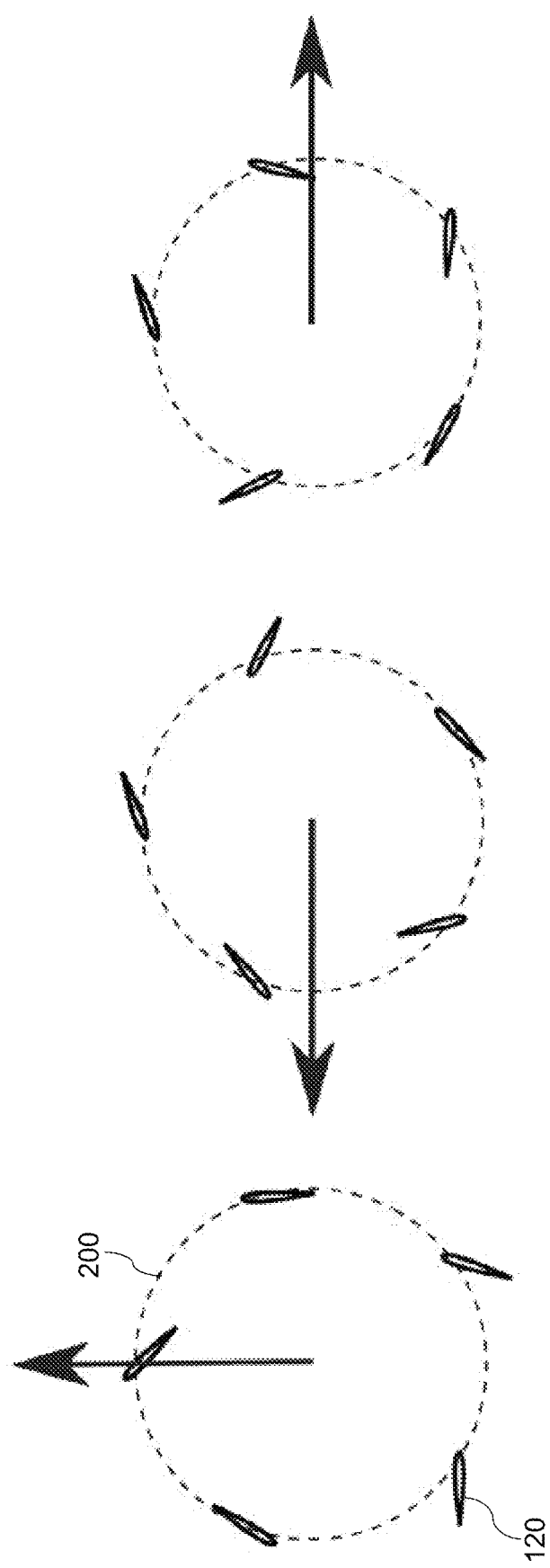
FIG. 3 illustrates varying the direction of thrust by changing blade pitch in a cyclorotor.

Thus, FIG. 3 illustrates varying the direction of thrust by changing blade pitch in a cyclorotor. Specifically, FIG. 3 shows how varying the pitch of the blades 120 relative to the cycle (indicated by the dotted line 200) can quickly vary the direction of thrust (indicated by the arrows), where three specific examples are shown. It will be understood that, in hovering flight, there is an angle at which the thrust vector may be offset from the phasing of maximum pitching amplitude due to an offset lift vector angle on the downstream blades—this angle is depicted in FIG. 2, but omitted in FIG. 3.

To achieve high efficiency operation, blade pitch motion should be varied with forward airspeed as well as for varying pilot control inputs. To that end, a device was developed, tested, and patented under U.S. Pat. No. 9,346,535, which is incorporated by reference in its entirety. The "ring cam and ring cam assembly for dynamically controlling pitch of cycloidal rotor blades" disclosed therein is configured to actuate cyclorotor blade pitch through the implementation of a three-dimensional contoured cam, an example of which is shown in FIG. 4.

Figure 4:
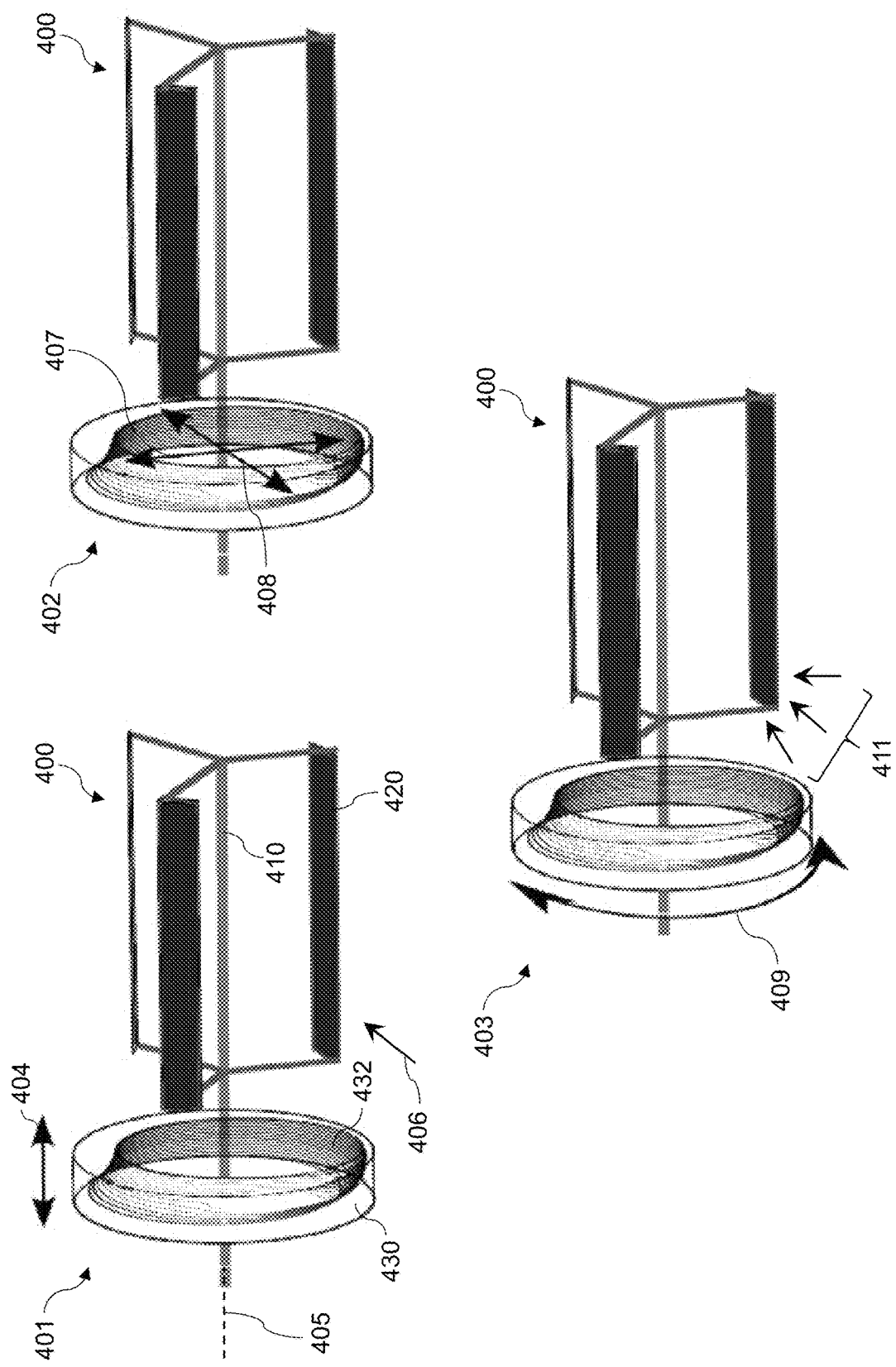
FIG. 4 illustrates various degrees of freedom of a cam for blade pitch control of a cyclorotor, in accordance with a representative embodiment.

FIG. 4 illustrates various degrees of freedom of a cam for blade pitch control of a cyclorotor, in accordance with a representative embodiment. Specifically, the cyclorotor 400 shown in the figure includes a control cam 430, a drive shaft 410, and a plurality of blades 420 coupled to the drive shaft 410. In the embodiment shown in FIG. 4, thrust vectoring of the cyclorotor 400 is achieved by the relative positioning of the drive shaft 410 (and thus the plurality of blades 420 coupled thereto) and the control cam 430. Specifically, thrust vectoring of the cyclorotor 400 is achieved using a control cam 430 that is contoured, such as that described in U.S. Pat. No. 9,346,535, and moving the drive shaft 410 along the contoured surface 432 of the control cam 430. Although FIG. 4 shows a three-dimensional contoured control cam 430, one skilled in the art will recognize that this embodiment is generally provided to describe how the relative movement of a drive shaft 410 and a control cam 430 can affect thrust vectoring of a cyclorotor 400. Thus, it will be understood that embodiments may also or instead include hydraulic positioning of the control cam 430 as described elsewhere herein, e.g., where the control cam 430 is not contoured.

The blade pitch motions that may be desirous for efficient flight can be attained by translating the control cam 430 with three degrees of freedom and rotating the control cam 430 with one degree of freedom. FIG. 4 shows three specific positions for the cyclorotor 400—a first position 401, a second position 402, and a third position 403. As shown in the first position 401, and by the first arrow 404, the control cam 430 may be translated along the axis of rotation 405 to account for, e.g., varying fluid velocity as shown by the second arrow 406. Thus, the first position 401 may represent changing the advance ratio of the cyclorotor 400. As shown in the second position 402, and by the third arrow 407 and fourth arrow 408, the control cam 430 may be translated substantially perpendicular to the axis of rotation 405 to alter the thrust vector. Specifically, as shown by the third arrow 407, the control cam 430 may be translated vertically to alter lift, and as shown by the fourth arrow 408, the control cam 430 may be translated horizontally to alter thrust. Thus, the second position 402 may represent changing rotor forces of the cyclorotor 400. As shown in the third position 403, and by the fifth arrow 409, the control cam 430 may be rotated to account for a changing wind incidence angle, e.g., relative to the rotor angle of attack as shown by the sixth arrows 411. Thus, the third position 403 may represent changing the rotor angle of attack for the cyclorotor 400.

The mode of cam motion shown here may accurately describe prolate advance ratios. At curtate advance ratios, the control cam 430 may not be translated perpendicular to the axis of rotation 405 as it would exceed the limits of the bell crank assembly that attaches to the blades 420. At curtate advance ratios, the control cam 430 is rotated to vector thrust and translated along the axis of rotation 405 to change the thrust magnitude. In these flight conditions, the thrust vectoring capability of the rotor may be reduced.

Rapidly and precisely moving the control cam 430 may be advantageous to effectively utilize the control cam 430 for blade pitch control of a cyclorotor 400, and thus the devices, systems, and methods described herein may rapidly, precisely, and reliably move control cams 430 for blade pitch control on cyclorotors 400.

In general, the present teachings may include the hydraulic positioning of a control cam 430 relative to the drive shaft 410 and/or blades 420 (or vice-versa) to provide for thrust vectoring in a cyclorotor 400. Instead of, or in addition to, using a contoured cam such as that shown in FIG. 4, blade pitch can be varied by translating one or more of the control cam 430 and the drive shaft 410 relative to one another in three or more degrees of freedom, and/or by rotating the control cam 430. To this end, to effectively utilize a control cam 430 for cyclorotor blade pitch control, a system capable of rapidly and precisely moving the cam/rotor shaft relative to one another may be desirous, such as that shown in FIG. 5.

Figure 5:
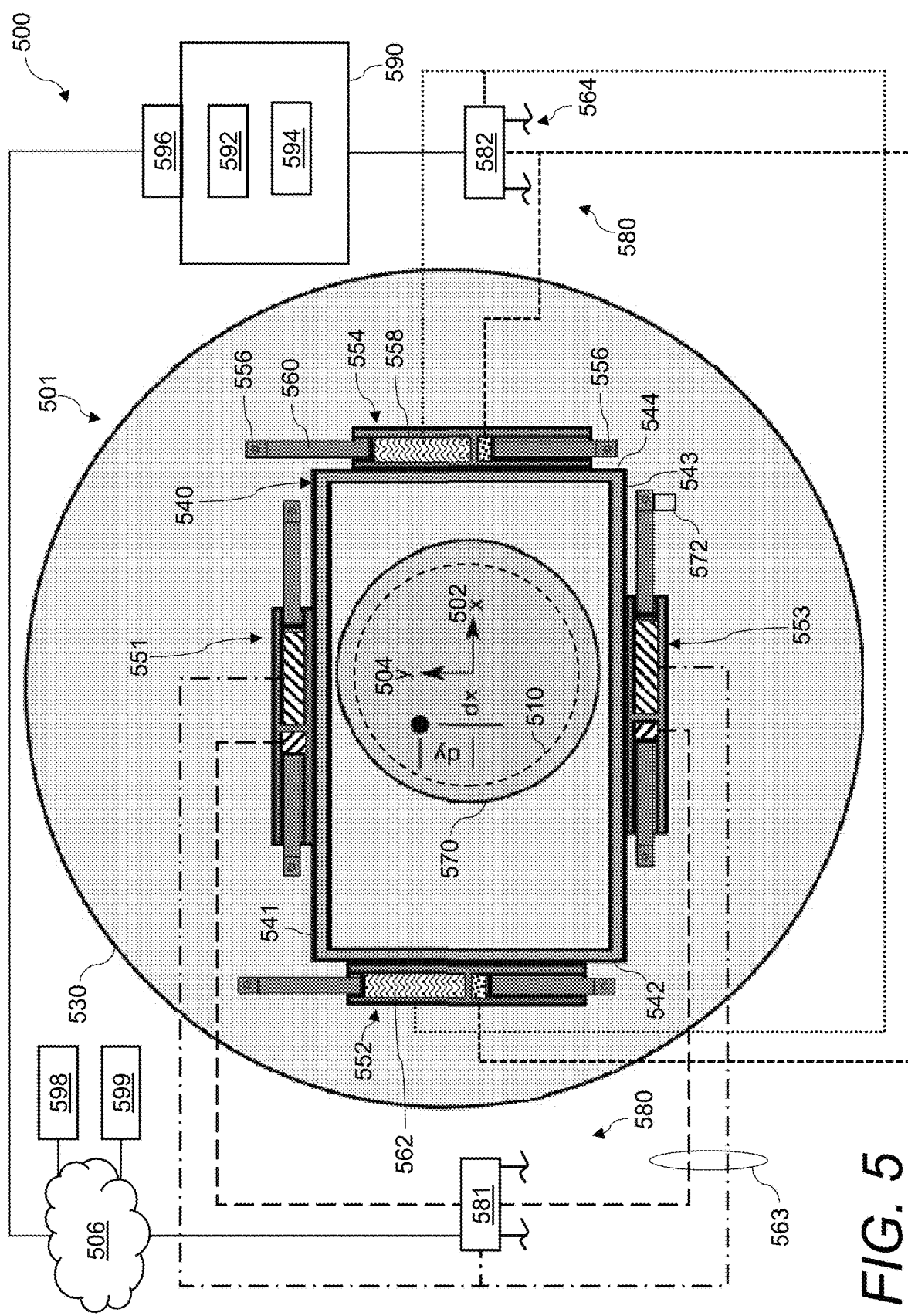
FIG. 5 illustrates a system for controlling thrust vectoring of a cyclorotor, in accordance with a representative embodiment.

FIG. 5 illustrates a system for controlling thrust vectoring of a cyclorotor, in accordance with a representative embodiment. The system 500 may represent an improvement over the techniques described in each of U.S. Pat. No. 9,346,535 and Adams, et al., "Design, Development, and Flight Test of a Small-Scale Cyclogyro UAV Utilizing a Novel Cam-Based Passive Blade Pitching Mechanism," INT'L JOURNAL OF MICRO AIR VEHICLES, Vol. 5, No. 2 (2013), where each of the foregoing is incorporated by reference in its entirety. The system 500 may also or instead include any of the teachings of the aforementioned disclosures.

The system 500 may include a hydraulic system 580 with a piston-cylinder configuration that provides for two or three-dimensional translation of a cam employed in cyclorotor pitch control. By varying the position of a cam in at least two dimensions, cyclorotor thrust can be quickly vectored in plane, and a third dimension can allow for optimization of blade pitch with forward speed. As discussed herein, the system 500 may completely eliminate bearings and provide redundant and reliable operation.

In general, the system 500 may include a cyclorotor including a drive shaft 510 and a plurality of blades, a control cam 530 (which may otherwise simply be referred to herein as a "cam"), a frame 540, and one or more positioning assemblies. The one or more positioning assemblies may be mounted to the frame 540, where the positioning assemblies are structurally configured to move both (i) the control cam 530 relative to the frame 540 and/or the drive shaft 510, and (ii) the frame 540 itself relative to the drive shaft 510 and/or the control cam 530. Thus, the system 500 may include positioners secured to a frame 540, where a control cam 530 is movable relative to the frame 540, and where the frame 540 itself is movable relative to a main structure of the cyclorotor. For example, in certain implementations, the system 500 may utilize a piston-cylinder configuration that provides for two or three-dimensional translation of the control cam 530 for pitch control of the cyclorotor. By varying the position of a control cam 530 in at least two dimensions, the thrust of the cyclorotor can be quickly vectored in plane, where a third dimension may allow for optimization of blade pitch with forward speed control for the cyclorotor. The system 500 can thus eliminate a need for additional bearings, and provide redundant operation.

The system 500 may, in part, include a device 501 for controlling thrust vectoring of a cyclorotor, where the device 501 includes the control cam 530, the frame 540, and the positioning assemblies. In general, the system 500 may provide for at least planar movement of the control cam 530 for thrust vectoring of the cyclorotor. To accomplish this movement of the control cam 530, the device 501 may include one or more positioning assemblies, e.g., at least four pairs of single-acting hydraulic cylinders or at least two pairs of double-acting hydraulic cylinders that are rigidly mounted to the frame 540. In the positioning assemblies, pistons on each cylinder may be fastened to either the control cam 530 or to a rotor drive shaft housing 570.

The drive shaft may 510 may be part of a cyclorotor as described herein, where the drive shaft 510 is coupled to a plurality of blades, and where positioning of the control cam 530 relative to the drive shaft 510 alters a pitch of one or more of the plurality of blades, e.g., for controlling thrust vectoring for the cyclorotor.

The control cam 530 may be positionable relative to the drive shaft 510 of the cyclorotor along each of a first axis and a second axis, where the drive shaft 510 is rotatable about a third axis. The first axis may be the x-axis 502 as shown in the figure, the second axis may be the y-axis 504 as shown in the figure, and the third axis (i.e., the axis of rotation) may be the z-axis, which would be extending through the figure. Thus, the first axis and the second axis may be substantially perpendicular to the third axis.

The control cam 530 may be substantially cylindrical, e.g., where the control cam 530 includes a smooth inner surface. The control cam 530 may instead include an inner surface that is contoured. Thus, the control cam 530 may be the same or similar to that described in U.S. Pat. No. 9,346,535. Movement of the control cam 530 relative to the drive shaft 510 along one or more of the first axis and the second axis may cause thrust vectoring of the cyclorotor, and movement of the control cam 530 relative to the drive shaft 510 along the third axis (e.g., rotation of the control cam 530) may shift blade pitching to account for changes in forward velocity of the cyclorotor. The control cam 530 may also or instead be rotatable about the third axis, where rotating the control cam 530 adjusts an angle of travel for an overall freestream flow through the cyclorotor.

The frame 540 may have a plurality of sides, where the frame 540 is disposed at least partly around the drive shaft 510 of the cyclorotor. For example, and as shown in the figure, the frame may be substantially rectangular, i.e., having four sides—a first side 541, a second side 542, a third side 543, and a fourth side 544. Other shapes for the frame 540 are also or instead possible. For example, the frame 540 may include another substantially polygonal shape, such as a triangle, another quadrilateral, a pentagon, a hexagon, and so on. The frame 540 may also or instead include rounded edges, and may thus include a rounded shape such as a circle, an oval, an ellipse, and so on. As discussed above, the frame 540 may be disposed at least partly around the drive shaft 510, e.g., completely surrounding the drive shaft 510 as shown in the figure.

The one or more positioning assemblies may be mounted to, or otherwise engaged with, the frame 540. For example, the one or more positioning assemblies may include a first positioning assembly 551 disposed on a first side 541 of the frame 540, a second positioning assembly 552 disposed on a second side 542 of the frame 540, a third positioning assembly 553 mounted on a third side 543 of the frame 540, and a fourth positioning assembly 554 mounted on a fourth side 544 of the frame 540. In an implementation, only two positioning assemblies—the first positioning assembly 551 and the second positioning assembly 552—are present. It will be understood that more or less positioning assemblies may also or instead be possible than what it shown in the figure.

The first positioning assembly 551 may be structurally configured to move the frame 540 along the first axis (e.g., the x-axis 502). In this manner, the entire frame 540 may be movable via operation and control of a positioning assembly in an implementation. For example, the frame 540 may be movable relative to the drive shaft 510 and/or another portion of the cyclorotor. Because the frame 540 may be coupled to the control cam 530, e.g., via the attachment of the second positioning assembly 552 to the control cam 530 as described below, movement of the frame 540 along the first axis may also move the control cam 530 along the first axis. In certain implementations, the frame 540 is movable along the first axis and fixed along the second axis, or vice-versa. In other implementations, the frame 540 is movable along both of the first and second axes.

The second positioning assembly 552 may be engaged with the control cam 530 and structurally configured to move the control cam 530 relative to the frame 540 along the second axis (e.g., the y-axis 504). Thus, in certain implementations, the second positioning assembly 552 may be operable and controllable to move the control cam 530, while the first positioning assembly 551 is operable and controllable to move the frame 540 itself. In this manner, because the positioning assemblies may be attached to the same frame 540, movement of the frame 540 along the first axis may simultaneously move the control cam 530 along the first axis through engagement of the second positioning assembly 552 with the control cam 530. Thus, in certain implementations, the control cam 530 may be movable along the first axis via the first positioning assembly 551 and movable along the second axis via the second positioning assembly 552.

In certain implementations, at least a portion of each of the first positioning assembly 551 and the second positioning assembly 552 is rigidly mounted to the frame 540. For example, the cylinder cavities 558 of positioning assemblies that include hydraulic cylinders may be fixedly mounted to the frame 540.

As mentioned above, and as shown in the figure, the positioning assemblies may include a first positioning assembly 551 disposed on a first side 541 of the frame 540, a second positioning assembly 552 disposed on a second side 542 of the frame 540, a third positioning assembly 553 disposed on a third side 543 of the frame 540, and a fourth positioning assembly 554 disposed on a fourth side 544 of the frame 540. As shown in the figure, the third side 543 may be disposed substantially opposite the first side 541, and the third positioning assembly 553 may be structurally configured to cooperate with the first positioning assembly 551 to move the frame 540 along the first axis (e.g., the x-axis 502). Also, as shown in the figure, the fourth side 544 may be substantially opposite the second side 542, and the fourth positioning assembly 554 may be engaged with the control cam 530 and structurally configured to cooperate with the second positioning assembly 552 to move the control cam 530 relative to the frame 540 along the second axis (e.g., the y-axis 504).

One or more of the positioning assemblies may take the form of hydraulic cylinders (e.g., a piston/cylinder mechanism), linear actuators, gears, pulleys, and the like. Regardless, in implementations, the positioning assemblies may include a plurality of movable ends 556. For example, each of the first positioning assembly 551 and the second positioning assembly 552 may include movable ends 556. Movable ends 556 of the second positioning assembly 552 may be coupled to the control cam 530. Movable ends 556 of the first positioning assembly 551 may be coupled to a housing 570 containing at least a portion of the drive shaft 510 of the cyclorotor. In this manner, the first positioning assembly 551 may be controllable to move the frame 540 relative to the housing 570 along the first axis (e.g., the x-axis 502). Movable ends of the first positioning assembly 551 may also or instead be coupled to a fixed structure 572 of the cyclorotor. In this manner, the first positioning assembly 551 may be controllable to move the frame 540 relative to the fixed structure 572 along the first axis (e.g., the x-axis 502).

The housing 570 containing at least a portion of the drive shaft 510 of the cyclorotor may be stationary relative to the drive shaft 510. In other words, as the drive shaft 510 rotates, the housing 570 does not rotate. The housing 570 may be a fixed portion of the cyclorotor body—e.g., the housing 570 and the fixed structure 572 may be part of the same structural framework for the cyclorotor.

Figure 8:
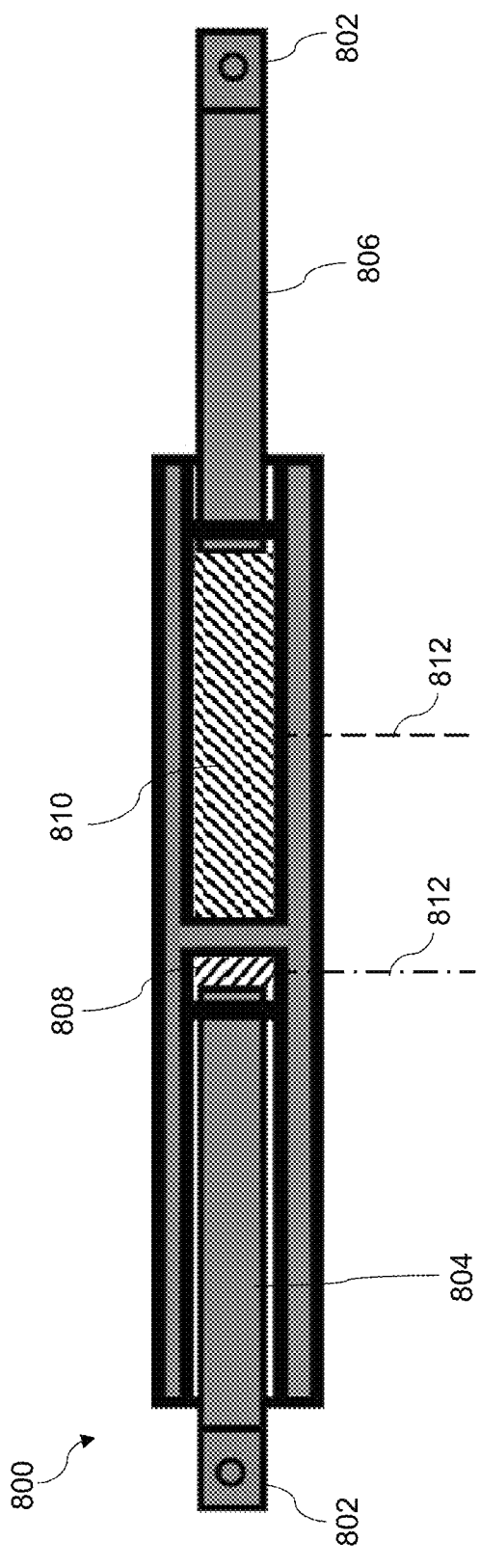
FIG. 8 illustrates a hydraulic cylinder for a device for controlling thrust vectoring of a cyclorotor, in accordance with a representative embodiment.
Figure 9:
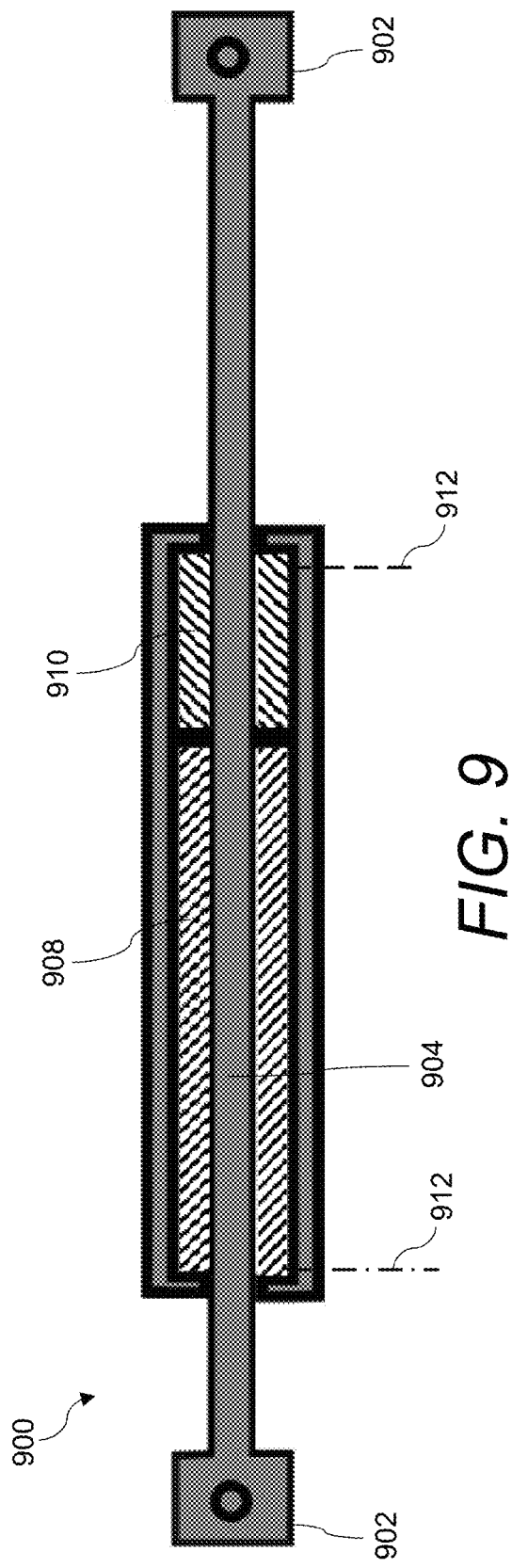
FIG. 9 illustrates a hydraulic cylinder for a device for controlling thrust vectoring of a cyclorotor, in accordance with a representative embodiment.

As discussed herein, one or more of the positioning assemblies may include hydraulic cylinders, e.g., double-acting cylinders. Each of the hydraulic cylinders may include a cylinder cavity 558 and a piston 560 at least partly disposed therein. For example, each of the first positioning assembly 551 and the second positioning assembly 552 may include a double-acting cylinder, where the movable ends 556 are disposed on one or more pistons 560 included in one or more cavities 558 of the double-acting cylinder. In certain implementations, each double-acting cylinder includes movable ends 556 coupled with one another along a single piston 560 (see, e.g., FIG. 9, depicting a single piston). In other implementations, each double-acting cylinder includes movable ends 556 disposed on separate pistons 560 (see, e.g., FIG. 8, depicting separate pistons).

In each of the double-acting cylinders, movement of a first movable end 556 may cause a movement of a second movable end 556. Thus, a distance between the first movable end 556 and the second movable end 556 in a single double-acting cylinder may be fixed. For example, fluid 562 driven into a first cylinder cavity 558 adjacent to a first movable end 556 may cause an exit of fluid 562 in a second cylinder cavity 558 adjacent to a second movable end 556. Movable ends 556 may instead be positionable independent of one another, or their relative positioning may be otherwise non-fixed.

The fluid 562 used in the double-acting cylinders or other types of hydraulic positioning assemblies may include one or more of oil, air, and water. Other fluids 562 are also or instead possible.

The system 500 may further include a hydraulic system 580 for controlling one or more of the positioning assemblies, e.g., the first positioning assembly 551 and the second positioning assembly 552. The hydraulic system 580 may be an open circuit type of system. The hydraulic system 580 may be one or more of electrically controlled and mechanically controlled. In implementations, the hydraulic system 580 includes one or more servo valves for controlling hydraulic fluid 562 provided to cylinders included on one or more of the positioning assemblies through one or more hydraulic lines 563, e.g., servo valves may control operation of the first positioning assembly 551 and the second positioning assembly 552. For example, and as shown in the figure, the system 500 may include a first valve 581 and a second valve 582, e.g., servo valves, where the first valve 581 is operable to control fluid 562 provided to the first positioning assembly 551 and the third positioning assembly 553 for controlling the position of the frame 540 along the first axis (e.g., the x-axis 502), and the second valve 582 is operable to control fluid 562 provided to the second positioning assembly 552 and the fourth positioning assembly 554 for controlling the position of the control cam 530 along the second axis (e.g., the y-axis 504). Each of the valves may include inlets/outlets 564 for the flow of high-pressure and low-pressure fluid 562 within the hydraulic system 580. The valves may receive signals for operation thereof from a controller 590 as described herein or otherwise known in the art.

In the system 500, the hydraulic lines 563 may be configured such that actuation of one valve will move all of the cylinders and the control cam 530 along a certain axis, and actuation of another valve will move all of the cylinders and the control cam 530 along another axis. Thus, each valve may control a single degree of movement of the control cam 530.

The system 500 may further include a controller 590, e.g., for controlling operation of one or more of the components of the system 500, e.g., the cyclorotor, the drive shaft 510, the control cam 530, the frame 540, the positioning assemblies, the hydraulic system 580, and so on. The controller 590 may include, or otherwise be in communication with, a processor 592 and a memory 594. The controller 590 may be electronically coupled (e.g., wired or wirelessly) in a communicating relationship with one or more of the components of the system 500. Thus, in an implementation, the controller 590 may include a processor 592 and a memory 594, where the processor 592 is configured to control one or more of the positioning assemblies (e.g., the first positioning assembly 551 and the second positioning assembly 552) to position them for providing positions for one or more blades of the cyclorotor according to one or more of a manual control, an auto-piloted control, and a feedback control. The blades of the cyclorotor may provide predetermined thrust vectoring for the cyclorotor, thus providing control of the cyclorotor.

As discussed above, the controller 590 may be operable to control the components of the system 500, where the controller 590 may include any combination of software and/or processing circuitry suitable for controlling the various components of the system 500 described herein including without limitation processors, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 590 may include the processor 592 or other processing circuitry with sufficient computational power to provide related functions such as executing an operating system, providing a graphical user interface (e.g., to a display coupled to the controller 590 or another component of the system 500), set and provide rules and instructions for operation of the cyclorotor or another component of the system 500, convert sensed information into positioning or other instructions, and operate a web server or otherwise host remote operators and/or activity through the communications interface 596 such as that described below. In certain implementations, the controller 590 may include a printed circuit board, an Arduino controller or similar, a Raspberry Pi controller or the like, a prototyping board, or other computer related components.

The controller 590 may be a local controller disposed on the cyclorotor, or a remote controller 590 otherwise in communication with the cyclorotor and its components. For example, one or more of the controller 590 and a user interface in communication with the controller 590 may be disposed on an external component (e.g., a computing device 598) in communication with the cyclorotor over a data network 506.

The processor 592 of the controller 590 may include an onboard processor for the cyclorotor. The processor 592 may also or instead be disposed on a separate computing device 598 that is connected to the cyclorotor through a data network 506, e.g., using the communications interface 596, which may include a Wi-Fi transmitter and receiver. The processor 592 may perform calculations for positioning of the cyclorotor and its components.

The processor 592 may be any as described herein or otherwise known in the art. The processor 592 may be included on the controller 590, or it may be separate from the controller 590, e.g., it may be included on a computing device 598 in communication with the controller 590 or another component of the system 500. In an implementation, the processor 592 is included on or in communication with a server that hosts an application for operating and controlling the system 500.

The memory 594 may be any as described herein or otherwise known in the art. The memory 594 may contain computer code and may store data such as sequences of actuation or movement of the cyclorotor, sequences for operation of the valves, and so on. The memory 594 may contain computer executable code stored thereon that provides instructions for the processor 592 for implementation. The memory 594 may include a non-transitory computer readable medium.

The system 500 may include a computing device 598 in communication with one or more of the components of the system 500 including without limitation the controller 590. The computing device 598 may include any devices within the system 500 operated by operators or otherwise to manage, monitor, communicate with, or otherwise interact with other participants in the system 500. This may include desktop computers, laptop computers, network computers, tablets, smartphones, smart watches, PDAs, or any other device that can participate in the system 500 as contemplated herein. In an implementation, the computing device 598 (and a user interface thereof) is integral with another participant in the system 500.

The data network 506 may be any network(s) or inter-network(s) suitable for communicating data and control information among participants in the system 500. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 500. The data network 506 may include wired or wireless networks, or any combination thereof. One skilled in the art will also recognize that the participants shown the system 500 need not be connected by a data network 506, and thus can be configured to work in conjunction with other participants independent of the data network 506.

Communication over the data network 506, or other communication between components of the system 500 described herein, may be provided via one or more communications interfaces 596. The communications interface 596 may include, e.g., a Wi-Fi receiver and transmitter to allow the logic calculations to be performed on a separate computing device 598. This may include connections to smartphone applications and the like. More generally, the communications interface 596 may be suited such that any of the components of the system 500 can communicate with one another. Thus, the communications interface 596 may be present on one or more of the components of the system 500. The communications interface 596 may include, or be connected in a communicating relationship with, a network interface or the like. The communications interface 596 may include any combination of hardware and software suitable for coupling the components of the system 500 to a remote device (e.g., a computing device 598 such as a remote computer or the like) in a communicating relationship through a data network 506. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 590 may be configured to control participation by the components of the system 500 in any network to which the communications interface 596 is connected, such as by autonomously connecting to the data network 506 to retrieve status updates and the like.

The system 500 may include other hardware 599. In certain implementations, the other hardware 599 may include a camera or other sensors, e.g., a position sensor, a pressure sensor, and the like. The other hardware 599 may also or instead include a power source. The power source may be any known in the art or that will become known in the art. For example, power sources may include an AC to DC converter (e.g., grid power), solar power, battery power, wind power, fossil fuel sourced power, and so on.

The other hardware 599 may also or instead include controls for an aircraft, ship, or submarine, as well as input devices such as a keyboard, a touchpad, a computer mouse, a switch, a dial, a button, and the like, and output devices such as a display, a speaker or other audio transducer, light emitting diodes or other lighting or display components, and the like. Other hardware 599 of system 500 may also or instead include a variety of cable connections and/or hardware adapters for connecting to, e.g., external computers, external hardware, external instrumentation or data acquisition systems, and the like.

Figure 6:
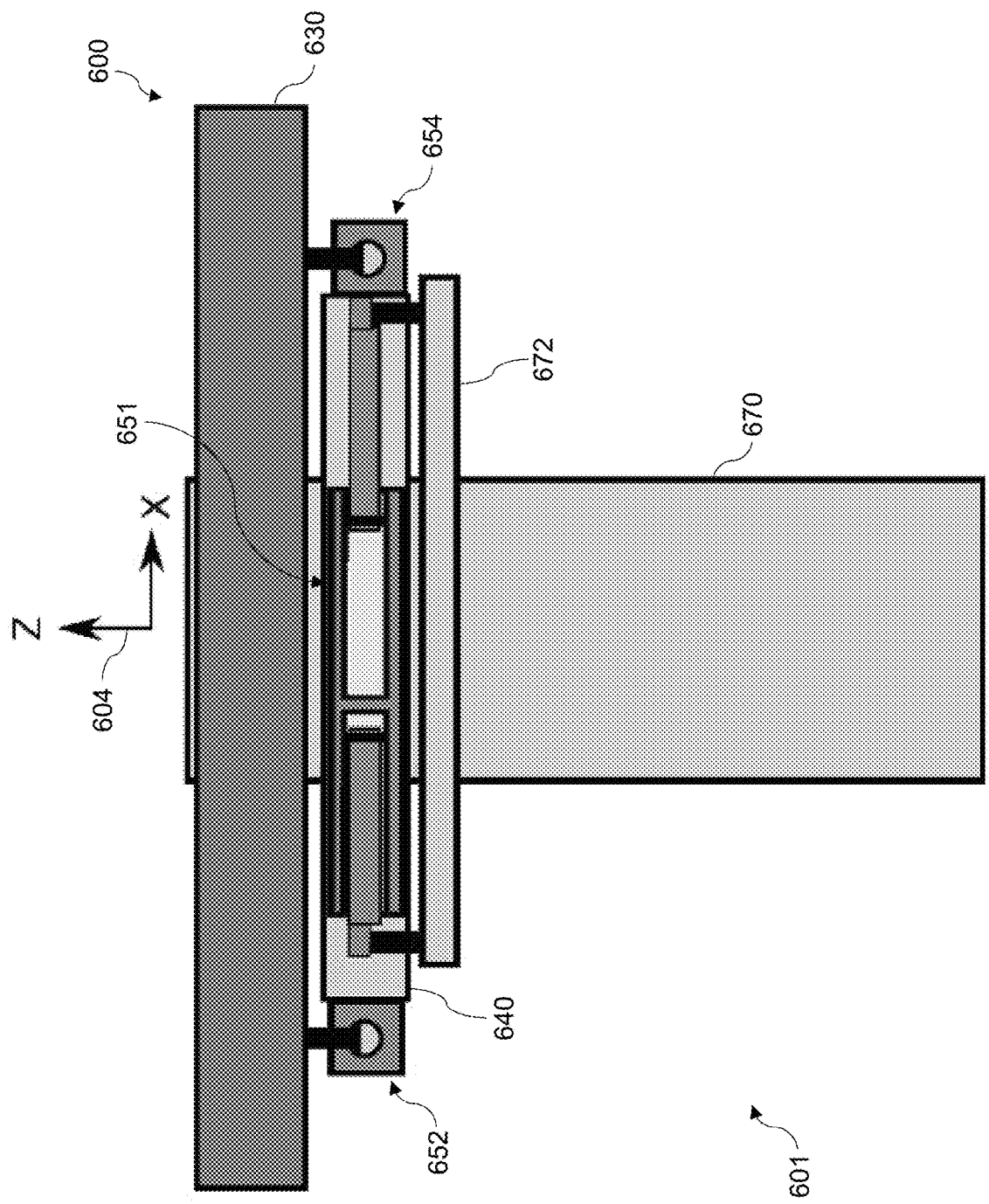
FIG. 6 is a top view of a device for controlling thrust vectoring of a cyclorotor, in accordance with a representative embodiment.

FIG. 6 is a top view of a device for controlling thrust vectoring of a cyclorotor, in accordance with a representative embodiment. Specifically, the figure depicts a top view of the device 600 and a portion of the cyclorotor 601. The figure shows a control cam 630, a frame 640, one or more positioning assemblies, and a housing 670 containing at least a portion of the drive shaft of the cyclorotor 601. The device 600 shown in the figure may provide for planar-only movement of the control cam 630, i.e., where the control cam 630 is not translated along a third axis (i.e., the z-axis 604), nor is the control cam 630 rotated about the third axis. Thus, FIG. 6 may represent a relatively simplified variation of a device 600 as described herein, with exclusively planar motion of the control cam 630.

Stated otherwise, in some applications, adjustment of the cam profile with forward speed (by translating the control cam 630 along the z-axis 604) and rotation of the control cam 630 are not needed or desirous. In these applications, the device 600 may be simplified by attaching one or more positioning assemblies—e.g., the first positioning assembly 651 and the second positioning assembly 652 shown in the figure—to a fixed structure 672 of the cyclorotor 601, such as the platform shown in the figure. The attachment of the positioning assemblies to the fixed structure 672 may include a rigid attachment.

The figure also shows the second positioning assembly 652 and the fourth positioning assembly 654 attached to the control cam 630, e.g., rigidly attached to the control cam 630.

Figure 7:
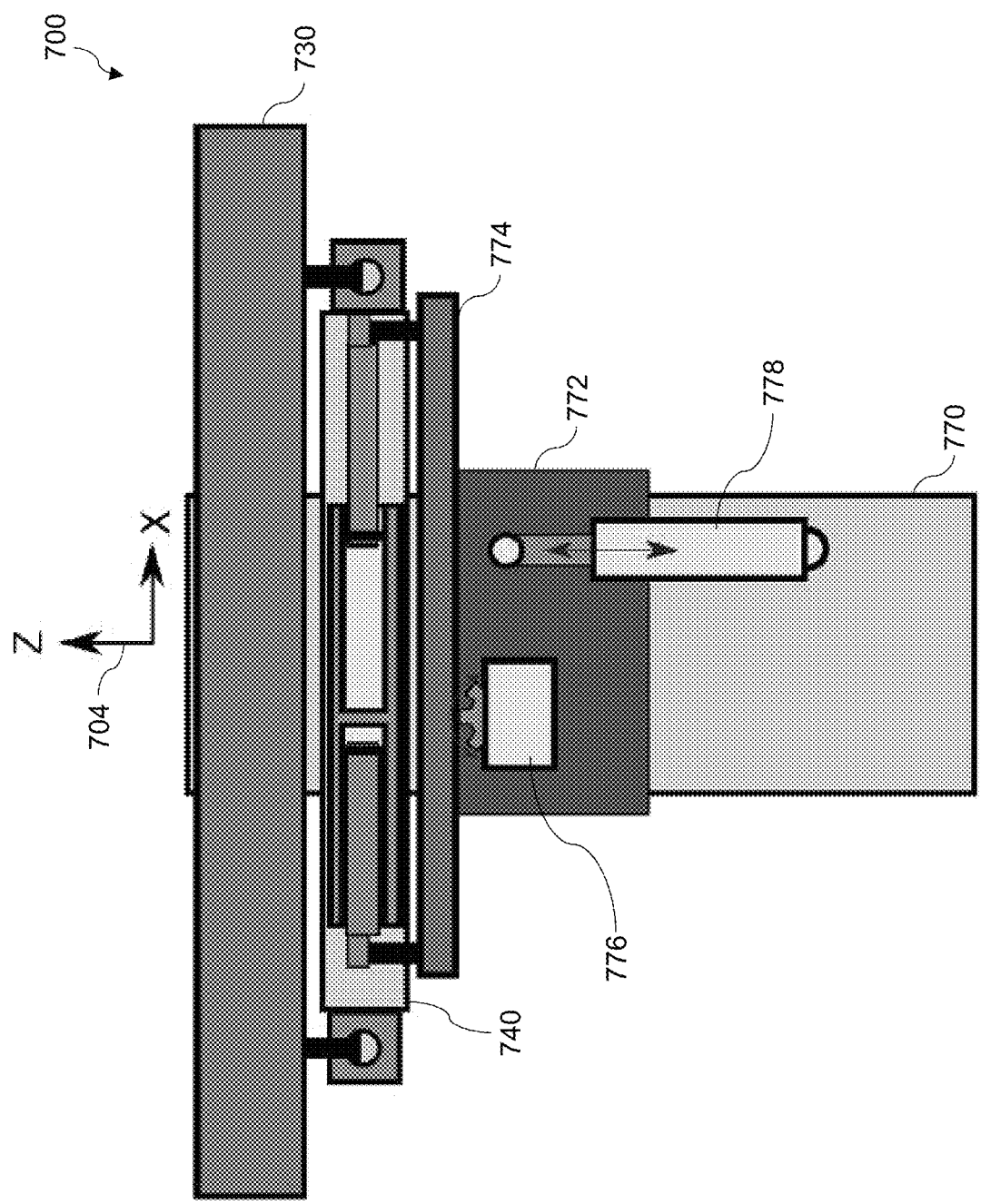
FIG. 7 is a top view of a device for controlling thrust vectoring of a cyclorotor, in accordance with a representative embodiment.

FIG. 7 is a top view of a device for controlling thrust vectoring of a cyclorotor, in accordance with a representative embodiment. The device 700 shown in FIG. 7 may be similar to the device 600 shown in FIG. 6, but the device 700 in FIG. 7 is structurally configured to provide movement of the control cam 730 along a third axis (e.g., the z-axis 704). While planar movement (i.e., movement along a plane defined by a first and second axis, such as an x and y axis) of a control cam 730 may provide thrust vectoring for a cyclorotor, translation out of plane (i.e., movement along a third axis, such as the z-axis 704) of a control cam 730 may enable a three-dimensionally contoured control cam 730 or the like to adapt blade pitch kinematics to varying flight conditions. To provide such movement, the frame 740 may be structurally configured to slide along a housing 770 containing at least a portion of the drive shaft of the cyclorotor or another structure of the cyclorotor, e.g., using a sleeve 772 or the like. Also, or instead, the control cam 730 may be rotatable about the third axis (the z-axis 704), e.g., using a rotatable structure 774 (such as a rotating platform or the like) that is engaged with one or more of the positioning mechanisms, the frame 740, or the control cam 730 itself.

Thus, in implementations, the control cam 730 may be positionable relative to the drive shaft along the third axis (the z-axis 704). The positioning of the control cam 730 along the third axis may include one or more of a rotation of the control cam 730 about the third axis and a translation of the control cam 730 along the third axis. For rotating the control cam 730, a rotary actuator 776 or the like may be used. For example, as shown in the figure, the rotary actuator 776 may be engaged with a rotatable structure 774 (such as a rotating platform) that is coupled to the control cam 730. Thus, to adjust blade pitch kinematics for varying rotor angle of attack, the control cam 730 may be rotated by the rotary actuator 776, which varies the angle of a rotatable structure 774, e.g., a rotating platform mounted to the sleeve 772. Alternatively, this rotation can be accomplished passively, e.g., by pitching of the cyclorotor. The rotation of the control cam 730 may also or instead be accomplished through another mechanical device, as will be apparent to one skilled in the art.

As discussed above, the device 700 may also or instead provide for movement of the frame 740 along the third axis (the z-axis 704). To this end, the device 700 may include a positioner 778 coupled to each of the frame 740 and the housing 770 containing at least a portion of the drive shaft of the cyclorotor, where the positioner 778 is adjustable for moving the frame 740 relative to the housing 770 along the third axis. The positioner 778 may include a linear actuator such as an electric actuator, a hydraulic actuator, or similar. For example, the positioner 778 may include a hydraulic cylinder, which may be similar to those used for the positioning assemblies. Also, the frame 740 may include a slider movably engaged with the housing 770. The slider may include one or more of a platform and a sleeve 772 disposed at least partially around the housing 770.

It should be noted that, in embodiments, the rotation of the control cam 730 and the translation of the control cam 730 relative to the third axis need not be as rapid as the planar movement of the control cam 730 along the first and second axes. That is, because rotation and z-axis translation of the control cam 730 may be correlated to aircraft speed and climb angle, rather than to aircraft control, they can generally respond more slowly than the thrust vectoring provided by control cam 730 translation along the x and y-axes. Consequently, rotation and z-axis translation of the control cam 730 may be actuated by one or more of a variety of actuators including hydraulics, electric linear actuators, mechanical linkages, and combinations thereof.

FIG. 8 illustrates a hydraulic cylinder for a device for controlling thrust vectoring of a cyclorotor, in accordance with a representative embodiment. Specifically, FIG. 8 shows a double-shaft, double-acting hydraulic cylinder 800, which may be used in the devices, systems, and methods described herein, e.g., for one or more of the positioners and positioning assemblies. As shown in the figure, the hydraulic cylinder 800 may include movable ends 802 connected to one or more pistons—e.g., a first piston 804 and a second piston 806. The hydraulic cylinder 800 may also include a first cylinder cavity 808 and a second cylinder cavity 810, which can be pressurized by a hydraulic fluid 812 to move the pistons and thus the movable ends 802. The hydraulic fluid 812 provided in each cylinder cavity may be the same, or it may be different.

FIG. 9 illustrates a hydraulic cylinder for a device for controlling thrust vectoring of a cyclorotor, in accordance with a representative embodiment. Specifically, FIG. 9 shows a double-acting hydraulic cylinder 900, which may be used in the devices, systems, and methods described herein, e.g., for one or more of the positioners and positioning assemblies. As shown in the figure, the hydraulic cylinder 900 may include movable ends 902 connected to a single piston 904. The hydraulic cylinder 900 may also include one or more cylinder cavities, e.g., a first cylinder cavity 908 and a second cylinder cavity 910, which can each be pressurized by a hydraulic fluid 912 to move the piston 904 and thus the movable ends 902.

In either of the cylinders shown in FIGS. 8 and 9, the cylinders may be structurally configured such that, if fluid is driven into one of the cylinder cavities, the other piston will be driven inward and drive out the fluid from the opposing side. Thus, each movable end may correspond to, and move in a coordinated manner with, another movable end.

Figure 10:
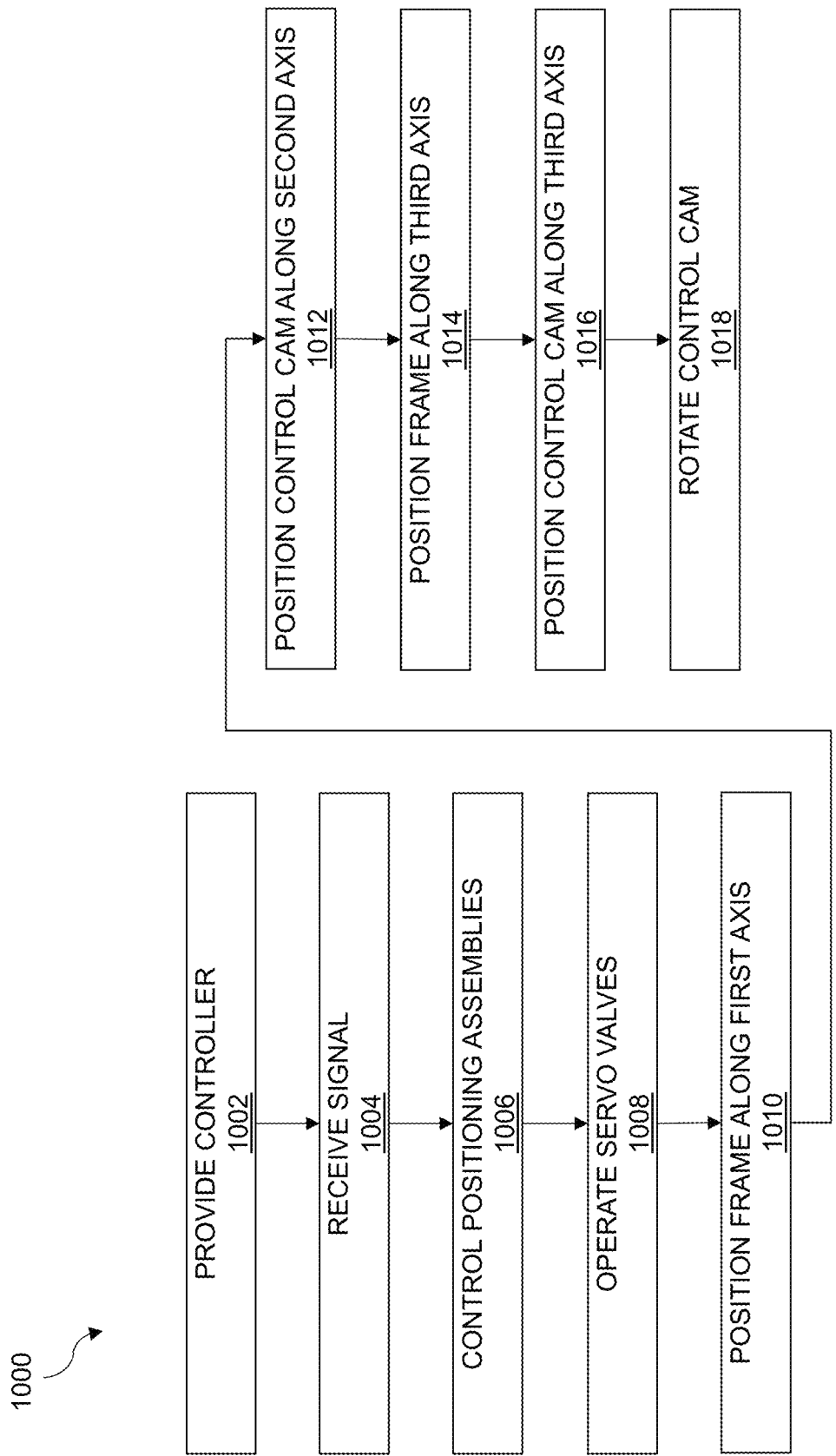
FIG. 10 is a flow chart of a method for controlling thrust vectoring of a cyclorotor, in accordance with a representative embodiment.

FIG. 10 is a flow chart of a method for controlling thrust vectoring of a cyclorotor, in accordance with a representative embodiment. The method 1000 may be implemented using one or more of the devices and systems described herein. For example, the method may be implemented using a system that includes a cyclorotor, a control cam, a frame, and one or more positioning assemblies as described herein. It will be understood that the blocks displaying techniques used in the method 1000 may be performed separately, simultaneously, or some combination thereof, e.g., operating servo valves to adjust one or more positioning mechanisms.

As shown in block 1002, the method 1000 may include providing a controller having a processor and a memory. The processor may read an output of a sensor (e.g., a position sensor) indicating a relative position of the frame and the control cam, and the controller may adjust the relative position of the frame and the control cam based on the output of the sensor to provide predetermined thrust vectoring for the cyclorotor.

As shown in block 1004, the method 1000 may include receiving one or more signals, e.g., from a sensor as described in block 1002 above. The signals may also or instead be received from one or more of a manual control, an auto-piloted control, and a feedback control for controlling one or more positioning assemblies. In certain implementations, feedback control may be used for both control cam positioning and aircraft control. For example, to accurately position the control cam with a computer, a position sensor on the hydraulic cylinders may be read by the computer and hydraulic servo valves may be adjusted to achieve a desired cylinder position or velocity. Feedback control may also be used to move the cam to alter thrust and to stabilize a cyclorotor.

As shown in block 1006, the method 1000 may include controlling one or more positioning assemblies, e.g., controlling a first positioning assembly for positioning the frame and controlling a second positioning assembly for positioning the control cam.

As shown in block 1008, the method 1000 may include operating one or more servo valves for controlling hydraulic fluid provided to one or more cylinders included on one or more positioning assemblies. The method 1000 may thus also include controlling electrical signals for operating the valves. The method 1000 may also or instead include controlling one or more of pumps, motors, and the like, for operating a positioner or a positioning assembly.

As shown in block 1010, the method 1000 may include positioning the frame along a first axis, where the frame includes a plurality of sides disposed at least partly around a drive shaft of a cyclorotor, and where the frame is engaged with the control cam such that movement of the frame along a first axis simultaneously moves the control cam along the first axis.

As shown in block 1012, the method 1000 may include positioning the control cam relative to the frame along a second axis. As discussed herein, positioning of the control cam may alter a pitch of one or more of a plurality of blades of a cyclorotor.

As shown in block 1014, the method 1000 may include positioning the frame along a third axis about which the drive shaft of the cyclorotor is rotatable, where the first axis and the second axis are substantially perpendicular to the third axis.

As shown in block 1016, the method 1000 may include positioning the control cam relative to the drive shaft along a third axis about which the drive shaft is rotatable, where the first axis and the second axis are substantially perpendicular to the third axis. As discussed herein, the control cam may include an inner surface that is contoured, where movement of the control cam relative to the drive shaft along one or more of the first axis and the second axis causes thrust vectoring of the cyclorotor, and where movement of the control cam relative to the drive shaft along the third axis shifts blade pitching to account for changes in forward velocity of the cyclorotor.

As shown in block 1018, the method 1000 may include rotating the control cam about a third axis about which the drive shaft is rotatable. As discussed herein, rotating the control cam may adjust an angle of travel for an overall freestream flow through the cyclorotor.

The teachings disclosed herein may enable reliable and rapid thrust vectoring of cyclorotors. For example, the various hydraulic cylinder configurations disclosed herein may conform around the cyclorotor rotating shaft and a rotating shaft housing. Certain implementations may completely omit bearings, ball screws, or linear rails in the design, thus increasing the reliability of the devices, systems, and methods disclosed herein. Also, in certain implementations, by implementing single-acting pistons in tandem, a larger surface area can be presented to the hydraulic fluid used in a hydraulic system, which can increase the maximum hydraulic force used in the systems, devices, and methods. The teachings disclosed herein may also or instead allow for the use of larger piston rods that can better support side loads on the pistons. These and other advantages may make it possible to decrease the overall size and weight of a hydraulic system. The teachings disclosed herein may also be relatively simple to manufacture, e.g., using off-the-shelf hydraulic components and basic machining techniques.

The teachings disclosed herein may be used in small or large-scale cyclorotors. As such, any commercial uses for a cyclorotor could thereby utilize the present teachings. For example, in aviation cyclorotors, the present teachings can be used for the control and propulsion of such airships, as the teachings can provide fast thrust vectoring and can enable airships to operate in relatively windy conditions. The present teachings may also or instead be used on micro-air vehicles or vehicles with low Reynolds numbers. In such instances, the hydraulics may be substituted with an electric motor and one or more ball screw assemblies. Also, the present teachings can be used in cyclorotors employed to lift, propel, and control a type of vertical takeoff and landing (VTOL) aircraft, e.g., a cyclogyro. Further, tugboats and ferries could also use the present teachings in cyclorotors included therein for propulsion and control. Currently, those machines may use a different blade pitch mechanism, but the present teachings could be used to substantially increase efficiency and maneuverability of those vessels. Also, the present teachings may be used for power generation, e.g., in wind turbines and the like. For example, the present teachings may be used in wind turbines to quickly compensate for changing wind velocity and magnitude, where many current wind turbines cannot generally account for second-scale variations in wind velocity due to atmospheric boundary layer turbulence and the like.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for controlling thrust vectoring of a cyclorotor, comprising:
positioning a frame along a first axis, the frame having a plurality of sides disposed at least partly around a drive shaft of a cyclorotor, where the frame is engaged with a control cam such that movement of the frame along the first axis simultaneously moves the control cam along the first axis;
controlling a first positioning assembly for positioning the frame relative to a first axis;
controlling a second positioning assembly for positioning the control cam relative to the frame along a second axis;
controlling a third positioning assembly for positioning the frame relative to the first axis;
controlling a fourth positioning assembly for positioning the control cam relative to the frame along the second axis;
wherein the first and third positioning assemblies movably connect the frame to a shaft housing surrounding the drive shaft;
wherein the second and fourth positioning assemblies movably connect the frame to the control cam; and
where positioning of the control cam alters a pitch of one or more of a plurality of blades of the cyclorotor.

2. The method of claim 1, further comprising positioning the control cam relative to the drive shaft along a third axis about which the drive shaft is rotatable, where the first axis and the second axis are substantially perpendicular to the third axis.

3. The method of claim 2, where the control cam comprises an inner surface that is contoured, where movement of the control cam relative to the drive shaft along one or more of the first axis and the second axis causes thrust vectoring of the cyclorotor, and where movement of the control cam relative to the drive shaft along the third axis shifts blade pitching to account for changes in forward velocity of the cyclorotor.

4. The method of claim 1, further comprising rotating the control cam about a third axis about which the drive shaft is rotatable.

5. The method of claim 4, where rotating the control cam adjusts an angle of travel for an overall freestream flow through the cyclorotor.

6. The method of claim 1, further comprising positioning the frame along a third axis about which the drive shaft is rotatable.

7. The method of claim 1, further comprising operating one or more servo valves for controlling hydraulic fluid provided to one or more cylinders included on one or more of the first positioning assembly and the second positioning assembly.

8. The method of claim 1, further comprising providing a controller having a processor and a memory, wherein the processor reads an output of a position sensor indicating a relative position of the frame and the control cam, and wherein the controller adjusts the relative position of the frame and the control cam based on the output of the position sensor to provide a predetermined thrust vectoring for the cyclorotor.

* * * * *